No. 684,015. Patented Oct. 8, 1901.
H. G. WEIBEZAHL.
PARALLEL PLIER NIPPERS.
(Application filed Mar. 1, 1901.)
(No Model.) 2 Sheets—Sheet 1.
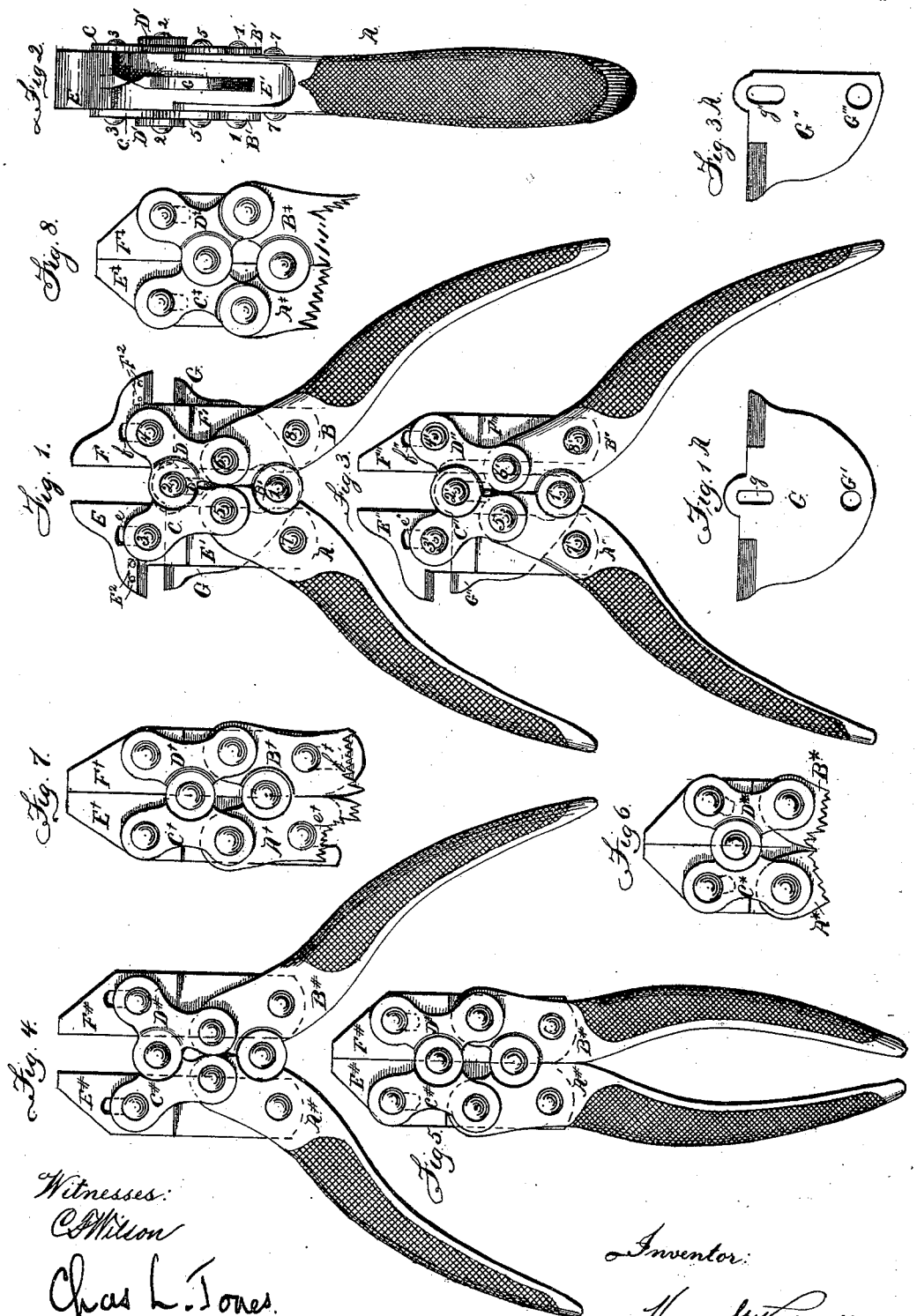
Witnesses:
C. J. Wilson
Chas L. Jones.
Inventor:
Norman G. Weibezahl No. 684,015. Patented Oct. 8, 1901.
H. G. WEIBEZAHL.
PARALLEL PLIER NIPPERS.
(Application filed Mar. 1, 1901.)
(No Model.) 2 Sheets—Sheet 2.
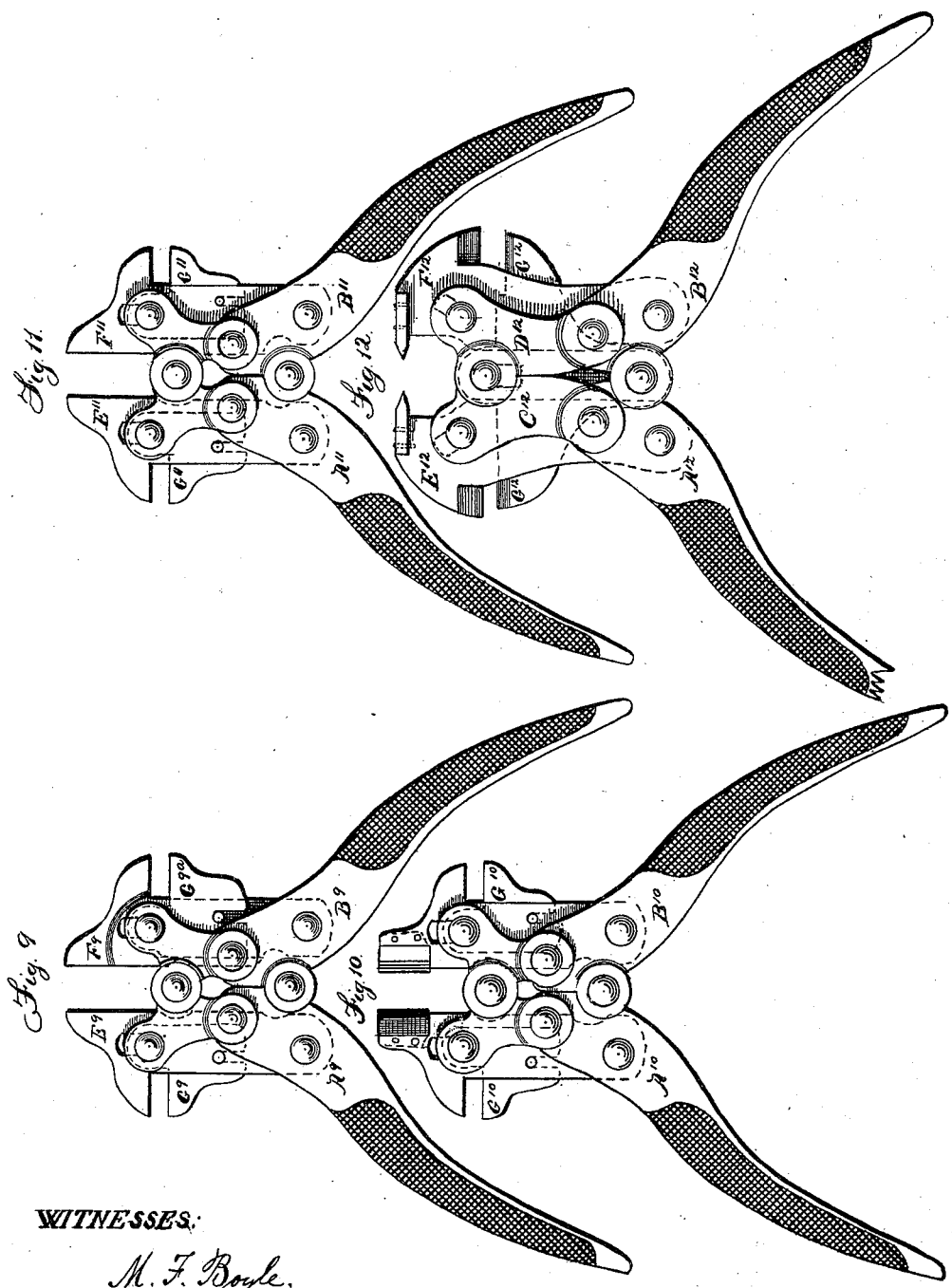
WITNESSES:
M. F. Boyle.
J. B. Clautice.
INVENTOR:
Herman G. Weibezahl

UNITED STATES PATENT OFFICE.

HERMAN G. WEIBEZAHL, OF NEW YORK, N. Y.

PARALLEL-PLIER NIPPERS.

SPECIFICATION forming part of Letters Patent No. 684,015, dated October 8, 1901.

Application filed March 1, 1901. Serial No. 49,458. (No model.)

*To all whom it may concern:*

Be it known that I, HERMAN G. WEIBEZAHL, a citizen of the United States, and a resident of the borough of Manhattan, city and county of New York, State of New York, have invented certain new Improvements in Parallel-Plier Nippers; and I hereby declare the following, taken in conjunction with the accompanying drawings, to be a full, clear, and exact description of the same, said drawings forming a part of this specification.

The object of the present invention is to provide a tool in the class of parallel working pliers which, in addition to certain advantages possessed by the pliers for which I made application for Letters Patent January 9, 1901, Serial No. 42,653, as well as those described in my application filed February 11, 1901, Serial No. 46,833, shall have a still greater ratio of power and possess other points of superiority and novelty which will be fully disclosed in the description of the tool. I will only note the new feature in cutting-knives which I have invented and incorporated in this tool, which consists in so arranging the knives or cutters that while traveling toward each other in a parallel position one cutting edge travels inwardly while the other remains stationary.

I have found one grave fundamental error in the construction of cutting-nippers such as at present on the market, which is that the knives are made to approach each other on the radius of a circle. Another lies in the fact that the more power the tool is designed to give the smaller is the radius in which the jaws are made to travel toward one another. This has been brought to such a state of exaggeration that in the most powerful nippers on the market to-day—the so-called "piano-wire" nippers—the radius described is that of a circle of about one and one-quarter inches in diameter only. The result is that the opening of the jaws is necessarily very limited to keep the opening stretch of the handles within bounds and that the tool is useless except for the cutting of comparatively small-sized wires. Working on so small a radius, the knives as they are entering the more solid part of the substance to be cut are therefore not following the line of the cut already made, but are obliged to force the metal un-equally away from the edges of the knives. This is still further aggravated by the fact that the cutting-jaws are not curved, but made to present an almost straight line across the head. The natural pressure of the metal cut would tend to force the cutters to cut a straight line, whereas from their radial motion they follow a curve instead of a chord of the circle. An unequal strain on the edges of the cutting-knives results, and as they are tempered with a view to hardness and not flexibility chipping out of pieces of the cutting-knives occurs, no matter how carefully used, but too frequently. The thicker the metal to be cut the greater of course is the twisting strain on the knives. Hence it is impractical to construct these tools to give more than a very limited cutting capacity. In my experimenting I have found that the same knives if driven through the same material of double the thickness will not chip out if the power be applied to them directly in the rear and if made to travel toward each other in an absolutely true line. Each side of the knife then bears an equal burden and strain from the metal to be displaced by the thicker portions of the knife. Less power is therefore required for the same work, there being, as shown, no displacement of material except for the thickening knives and all of that being distributed equally on both sides.

In tools of the side-cutting class some of the defects of the variety just mentioned are obviated; but I know of no construction in such tool where there is not some side play, tending to throw the knives out of a true line from each other when required to perform heavy work, since it is necessary to construct the jaws each on its separate lever. There is the further objection that only the easiest portion of the cut, that of its inception, is receiving the benefit of the greatest power, being nearest the fulcrum, and that the power decreases when most needed. A radial side cutter has also before this been constructed on parallel pliers; but the construction proved so faulty that the tool would close absolutely before the cutting-jaws could be made to approach each other even half way if the material to be cut was of any degree of hardness, while no attempt was made to provide means for keeping the cutting edges true toward each other, a sideway spring of the cutting-jaw not being provided against. With the object of overcoming these defects I designed the parallel pliers referred to by their serial numbers above, but found that while I obtained a very high ratio of power and developed automatically the greatest power when most needed—viz., at or near the termination of the closing movement—the tools were lacking in some important essentials when adapted for cutting-nippers, which fact led me to invent the tool which is the subject of the present application and which overcomes the objections against the present form of such tools enumerated above to a great extent, if not wholly.

It is well known that in cutting any tough substance the cut is more easily made if the knife is given a side sliding motion while making such cut; but I know of no construction of pliers in which attempt has been made to adapt that idea to their cutting-knives. In cutting metal too large for the tool by making incisions from different sides the remainder may be cut with ease. In cutting a pencil with a penknife by rolling it under the edge of the blade a clean cut is easily made, which would be nearly impossible by sheer force, no matter what power expended. I fail to find that these principles have ever before been utilized in such tools as now under consideration. I therefore set out to produce a tool in which the knives should be made to approach each other from exactly opposite points and be practically each a portion of the other to prevent wabbling or twisting and in which they are given a movement producing a shear cut and a tendency to roll the rod and cut the exterior surfaces before entering the solid center.

To provide a tool with still greater power than either of the others mentioned above, powerful as they are, was another of my objects. Taking the five-inch tools (shown in the illustrations) which are made with the regular proportion of length of hand-levers, it will be found that while I obtain in the case of one a ratio of six and one-half to one on the end jaws and thirteen to one on the side jaws and in the case of the other nine and one-half to one on the end jaws and eighteen and one-half to one on the side jaws I obtain in the tool now described a power of twelve and one-half to one on the end jaws and twenty-five to one on the side jaws. I can, as more fully shown hereinafter, increase this ratio very largely, yet without resorting to hand-levers out of proportion with the head of the tool or making it necessary to use both hands to grip the tool and apply the power. I have, therefore, so far as I know, constructed the most power-producing tool yet invented. I have at the same time made it a combination-tool applicable to other work than that of cutting, and by a double cutter make it possible to grasp and cut with this tool very much thicker substances than any cutting pliers or nippers of the compound leverage type so far produced is able to handle by making one set of cutters make a preliminary cut and finishing the cutting operation with the other set. This is accomplished by setting one of the cutting-faces of the cutter-plate employed in this construction at a lower level than its mate, as is fully shown in the illustrations, wherever the double cutter-plate is employed. I furthermore have made the tool applicable for other purposes, as I may substitute other jaws for those shown in the illustrations. I may set cutters in the end jaws to make the tool applicable for nipping bolts or screws close to the material they are set in, or I may set them lengthwise in the end jaws. I may also mount upon the shanks under side jaws in place of the cutting-knife, similar to those shown in my previous applications. I have at the same time taken into consideration the matter of cost of such a tool and have designed it so that its cost will be less than pliers having but one of the many superior attributes of this tool and that in an inferior degree.

While I have shown and shall describe the levers as made of sheet metal, I do not desire to limit myself to such construction. Neither do I wish to limit myself to the exact form or shape or material in any of the illustrations or in the description. I may make, for example, the jaws out of sheet-steel also instead of making them drop-forged, or may drop-forge portions of the levers or all of them, or use cast-steel.

For the purpose of illustrating my invention I will show and describe what I consider its best form and will afterward indicate certain important modifications.

Figure 1 is a general face view of the tool with the double cutters shown as open. Fig. 1^A is a view of the inner cutting-knives employed in this form of the tool. Fig. 2 is an edge view of the same tool shown as closed. Fig. 3 is a general face view of the tool with one jaw and one cutting-knife. Fig. 3^A is a view of the inner cutter or knife employed in the form of the tool shown in Fig. 3. Fig. 4 is a general face view of the tool with both sets of cutters omitted. Fig. 5 represents a similar view of the same tool closed. Fig. 6 is a partial view of a modification in which the secondary levers are lengthened at their rear ends and shortened forward of their fulcrums, with the slots in which the forward ends of the secondary levers work set on a slant to compensate for the relatively wider spread of the lower ends of the jaw-carrying members in the main levers. Fig. 7 is a partial view of the tool represented in Fig. 5, but with the slots set in the lower ends of the jaw-carrying members instead of in their upper portions, changing places with the pins shown in the other illustrations. Fig. 8 is a partial view of the tool represented in Fig. 5, with the jaw-carrying members of the same thickness throughout, the secondary levers being made to occupy the same plane as that on which the primary levers move by bending and offsetting the lower portions of the secondary levers. Fig. 9 represents a modification, shown as open, in which jaws sliding in and on the shanks are substituted for the cutter G. In this view I have shown one side-jaw within the vertical side slot and the other jaw embracing by its inner slot or recess the jaw-carrying member constructed with a shank thinner than its corresponding member. Fig. 10 is similar to Fig. 9, but has both the jaw-carrying members and side jaws alike on each side. It has, however, cutters mounted in the end jaws. Fig. 11 is similar to the last described figure, with the end cutters omitted, however. In the three last figures I have shown the side jaws slotted at their lower ends to work in connection with a pin set in the jaw-carrying members to hold the faces of the side jaws true to each other and parallel to each other in all positions. Fig. 12 represents a face view of the tool similarly constructed to that shown in Fig. 1. It has the cutter $G^{12}$ suspended on the fulcrum-pin of the secondary levers and operated by the fulcrum-pin of the primary levers. It has additional cutters mounted on the forward ends of the end jaws across their upper faces and has the secondary levers mounted as illustrated in Fig. 6.

As the construction of the last-named four figures will be readily understood from the description of the preceding figures, a more detailed description of them will not appear in this specification. All the parts are designated similarly to parts in the other constructions, with the additional designating characters of the different figures.

Referring to Fig. 1, A B are the primary levers. They are bifurcated, with lips of circular shape by which they are attached to each other and are held together by means of the fulcrum-pin 1, which is preferably made with a shoulder on each end and passed through both sets of lips and through the plate G, to be hereinafter described, and firmly attached to said lips by means of riveting the heads over, or is equipped with threaded studs and nuts to facilitate the removal of the cutters G. This binds the levers well together and prevents their buckling or springing. I may, however, employ two fulcrum-pins, if desired. The levers are preferably stamped out of sheet-steel of the proper thickness and formed to shape. The two sets of primary levers are connected at their upper extremities to sets of secondary levers C D, one pair on each side of the tool, by the pins or rivets 5 6, which on their inner sides are well set in countersunk holes in the primary levers, so as to work smoothly over and on the jaw-carrying members on which they are placed. The secondary levers are also joined by circular lips D', set at or near the mid-length of said levers. Each lip on each set of the levers is stamped to present a portion of a true circle, and one is made to overlap its companion and present a circular bearing on its inner side for the opposite lip. The upper ends of the secondary levers carry pins 3 4, which connect the opposite ends of each set of levers by passing through the slots $e\,f$.

E is a jaw-head attached to the shank E' and carries an end jaw and a side jaw. It is slotted vertically at $e$, in which slot works the pin 3, before referred to. The shank has also a vertical edge slot to allow the plate G to fit snugly within same, but with sufficient play to allow it to freely move up and down in the slot without friction. The rearward end of the shank E' is pinned to the lever A by the pin 7, upon which it works pivotally. At the upper end are one end jaw to match that carried by the member F and a side jaw extending outwardly at right angles to the end jaw. I groove out the center of this latter jaw for the purpose of inserting a knife or cutter in the same and fasten this cutter to the jaw by means of the pins $E^2$. The cutting-jaw may of course be made integral with the side jaw; but I prefer to set it in a separate cutter, so that it may be removed with ease and a new one be substituted in its place or taken out to be sharpened.

F is the opposite member to E. It is identical with it, but is clamped between the levers B D. Both members E and F are made thinner on those portions upon which the levers A B work to allow the secondary levers C D to lie flat upon the ends of the primary levers. In Fig. 8 I show a construction which obviates this necessity by bending the lower ends of the secondary levers C‡ D‡ over the ends of the tines of the primary levers A‡ B‡, the jaws being designated E‡ F‡. Where the secondary levers are made of drop-forged steel, this construction presents advantages over the other method; but where stamped metal is used I prefer to dispense with all unnecessary bending of the metal, as by it its first and best strength is impaired.

G is a steel plate passing inside of the horizontal slots in the members E F and is shaped into knives at those portions opposite to the cutters carried in the side jaws of the members E F. I provide a slot at $g$, in which works the pin 2, constituting the fulcrum-pin of the secondary levers, and is guided by said pin in its up-and-down movement.

G' is a hole made to match the fulcrum-pin 1 of the primary levers, which passes through the same and gives the upward movement to the plate.

In Fig. 3 I have shown the cutting provision on one side only, G'' referring to the cutting-plate. Other features of the tool corresponding with those in the construction illustrated in Fig. 1 are substantially the same, with the exception of the shanks F''' of the jaw-carrying member F'', which is cut away at its inner vertical edge for the reception of the corresponding cutting edge of plate G''. The several pins are designated by the reference characters 1' to 8', inclusive, while the slots in the jaw-carrying portions are referred to by $e''$ $f'''$. The slot in the cutting-plate is indicated by $g''$, while the lower perforation therein is designated by $G'''$.

Figs. 4 and 5 show the tool with end jaws only. Neither of the jaw-carrying members E※ F※ is slotted horizontally. Its construction and operation are otherwise identical with the other tool and will be readily understood therefrom. All the parts which correspond with similar ones in the preceding figures are designated by like reference characters, with the addition of the sign ※.

In Fig. 6 I show a different construction, applicable to all, which is used if a still greater ratio of power be desired than that given in the construction shown. As the ratio obtained by the tool described is very great and since, as shown, no power is wasted by the knives following a false line of cut in the cutting operation, it will probably be found amply sufficient in power to meet all the requirements without resorting to this form. The already-familiar parts of this tool are in this figure designated by their former reference characters, with the addition of the sign *.

In Fig. 7 the tool is provided with slots $e†$ $f†$ in the shanks of the jaw-carrying members E† F†. The secondary levers C† D† are operatively connected with the primary levers A† B†. This view presents a variation of the construction disclosed in the preceding figures.

In the construction of the tool I have taken into consideration the fact that to withstand the strain put upon the tool the parts must be well bound together and be made of proportionately heavier materials. The strain being taken by so many pivots in conjunction, the size shown is thought to be sufficient. The main fulcrum-pin 1 on the primary levers will be necessarily the strongest to prevent shearing. I may also increase the bearing-surfaces of the lips B' D' beyond that shown in the illustrations. In the case of bent sheet-steel I may shape the die to cut the metal, with an additional lip to fold back over the outer lips.

In the operation of the tool it will be seen that as the levers are pressed together the tines of the primary levers are carried outward, carrying with them the lower ends of the secondary levers, which forces inward the upper ends of the jaw-carrying members at the same rate of progress at which the lower ends are carried by the pins 7 8 in the lever-handles. The jaw-carrying members being pivotally attached by these pins, they are carried downward to a position considerably below the fulcrum-line, the fulcrum by this change being forced upward toward the load. The fulcrum of the secondary levers meanwhile is by the same change drawn downward to meet the main fulcrum. The forward ends of the secondary levers are in the closing movement forced upward in the slots $e$ $f$ until near the termination of the closing movement, when they again travel downward, though to a limited extent, keeping well behind the load at all times, however. The slots $e$ $f$ are therefore shorter than in the case of the constructions which were made the subjects for previous applications for patents. It will be seen that in this construction I obviate the lengthening of the tool to any considerable extent, as I offset the circle described by the ends of the primary levers by the circle described by the secondary levers and make the movement approach the true parallel lateral motion similar to the tools described in my former applications referred to. As in those applications I discussed this question, I will not dwell upon this feature. The cutter-plate G being pivoted on the fulcrum-pin 1 is forced upward in relation to the side jaws E F, which while receding travel downward at the same time. The effect therefore is to give the two knife-edges an apparently double opposite motion. In reality, however, the side jaw alone executes a side motion. The cutter G is held in a parallel position to the side jaws by the slot $g$, in which the fulcrum-pin 2 travels. It will be seen that there is no opportunity for the cutting-knife to be forced to one side or the other, as it is practically an integral part of the jaw-carrying members, being held firmly between both, and that the cutting edges must work toward each other on a perfectly true line. The side motion given to the side jaw tends to give the object manipulated on a rolling motion between the knives and to cut the outer edges before reaching the central portions. In the case of a stationary object the tendency of the tool is to turn about the object. The tool thus accomplishes what I have designed it for, viz: The knives are driven through the material to be cut in a true line toward one another, being given at the same time a shearing motion by the inward motion of the knife in the upper side jaw. By these means I obtain the full theoretical power of the tool, except that lost by friction, losing none, however, by reason of a false cutting-line being described by the knives.

The modification shown in Fig. 7 is applicable to the tool in Fig. 1 also, especially where power is not sought for in such an extreme as I have produced in the tool designated by the latter figure. The jaw-carrying members in this case being held firmly by the upper extremities of the secondary levers and sliding, by means of the slots $e$ $f$, over the pivots set stationary in the handle portions of the primary levers, the jaws are carried upward in the closing movement until near the termination of this movement, when they again descend. The upward movement of the fulcrum-pin in the primary levers is more rapid and continuous throughout the closing movement. If this form be utilized in conjunction with side jaws and the cutter G, a larger object may be grasped and cut. Much of the power would, however, be lost by this change, owing to the increased opening between the side jaws and cutter; but where lower side jaws are substituted for the cutter G, as shown in Figs. 9, 10, and 11, a certain advantage is gained by this arrangement.

Other modifications may be made without sacrificing the advantages of my invention or departing from its principles, and parts of the construction shown may be used without others.

What I claim is—

1. In pliers, uncrossed primary levers, bifurcated, working in conjunction with uncrossed secondary levers, with jaw-carrying members located in, and attached to same, and equipped with means to produce parallel motion, and all coacting with one another, substantially as set forth.

2. In pliers, cutters, one mounted on a centrally-hung cutter-plate having free longitudinal motion, the other, mounted in the jaw-carrying member, having a downward and lateral motion, each of the said cutters mounted and held parallel one to the other, in respect to their cutting-surfaces, all substantially as herein specified.

3. In pliers, end jaws and side jaws, with corresponding cutters set opposite cutters in said side jaws, equipped with means to insure parallel movement to the end jaws, and with sets of levers coacting with said means to secure the simultaneous parallel movements of the various jaws and cutters, all combined and arranged substantially as set forth.

4. In parallel pliers having a descending side jaw with cutter-knife and a main and secondary fulcrum, a cutting-knife carried on the main fulcrum and in sliding engagement with the secondary fulcrum, to permit the rising of same to meet the descending cutter-knife of the side jaw, together with operative connections, all coacting, substantially as set forth.

5. In pliers, a cutting-jaw moving toward a corresponding cutter guided and laterally engaged by the shank of said jaw, the cutting-jaw with a lateral side motion in its descent, with means for retaining the parallel position of both the cutter and the side jaw toward each other, substantially as set forth.

6. In parallel pliers, uncrossed primary and secondary levers, jaw-carrying members equipped with end jaws and engaged with said levers, side jaws engaging said levers and members respectively by a pin-and-slot engagement at one extremity and having pivotal connection at the other extremity, all equipped with means, and coacting with said means, to bring each jaw toward its companion jaw, substantially as set forth.

7. In pliers, cutters, in sets, one set on each side of the tool, with one of said sets only partially closed when the other set is completely closed, each cutter being at all times held parallel to its companion, with the upper side cutters approaching their companion cutters with a sideway motion in their descent, all combined and arranged substantially as herein specified.

8. In parallel pliers, primary and secondary levers and jaw-carrying members attached thereto, and working on same, said levers also joined to each other and each set joined by fulcrums and fulcrum-pins, and all equipped with means, coacting with one another to operate the jaws in said tool simultaneously by the motion of the handle-levers, all substantially as set forth.

9. In pliers, end jaws attached to members carrying each a side jaw, equipped with means to insure parallel movements of the end jaws, cutter-knives operated in conjunction with and approaching said side jaws in parallel motion, and with a single pair of operating-handles pivoted to secondary levers, all coacting with one another, substantially as set forth.

10. In parallel pliers, end jaws carried on shanks having side jaws extending at right angles therefrom, a cutting-knife guided by said shanks parallel to said side jaws, the latter traveling inwardly while descending, said cutting-knife in its ascent traveling outwardly relatively from said shanks, all equipped with means for such movements substantially as set forth.

11. Parallel pliers actuated by two sets of levers, the primary set joined by a common fulcrum and attached to the secondary levers, also connected by a common fulcrum, said secondary levers connected, at their forward ends, through slots in the jaws of the tool, the shanks of said jaws being pivotally attached to the rear of the fulcrum of said primary levers, all arranged and coacting substantially as set forth.

12. In pliers of the class described, primary bifurcated levers having a common fulcrum, the tines of said levers working each on the same side of the tool with the lever-handles to which they are attached, sets of secondary levers also fulcrumed so that each works in conjunction with its primary lever on the same side of the tool, having attached to them, and in coactive conjunction therewith, parallel jaws carried on shanks, in pin-and-slot engagement at one extremity and pivotally connected at the other extremity, all substantially as set forth.

13. In pliers of the class described, primary and secondary levers, jaws and connections therefor with and to said levers, one of those connections pivotal with the primary levers, the other in operative engagement with the secondary levers so as to cause the jaws to retract as they approach each other and to reduce the lengthening of the tool in its closing movement, all arranged and coöperating substantially as set forth.

14. Pliers having parallel moving jaws actuated by two sets of levers, the fulcrums of each approaching each other in their closing movement, the fulcrum of the main levers approaching the load, and the jaw-carrying members receding within the primary levers, the secondary levers rising toward and behind the load to afford a direct grasp in the closing movement, all combined substantially as set forth.

15. In pliers, cutters suspended within the jaws or jaw-carrying members and operating through the same in connection with corresponding cutters set in the jaws, so that the cutters are always in direct line with the cutters suspended within them, and neither can be forced to either side, but works true against its companion, substantially as set forth.

In testimony that I claim the invention above set forth I affix my signature in presence of two witnesses.

HERMAN G. WEIBEZAHL.

Witnesses:
M. F. BOYLE,
J. B. CLAUTICE.